No. 883,563. PATENTED MAR. 31, 1908.
W. B. PARRISH.
SEED DROPPER.
APPLICATION FILED OCT. 18, 1907.
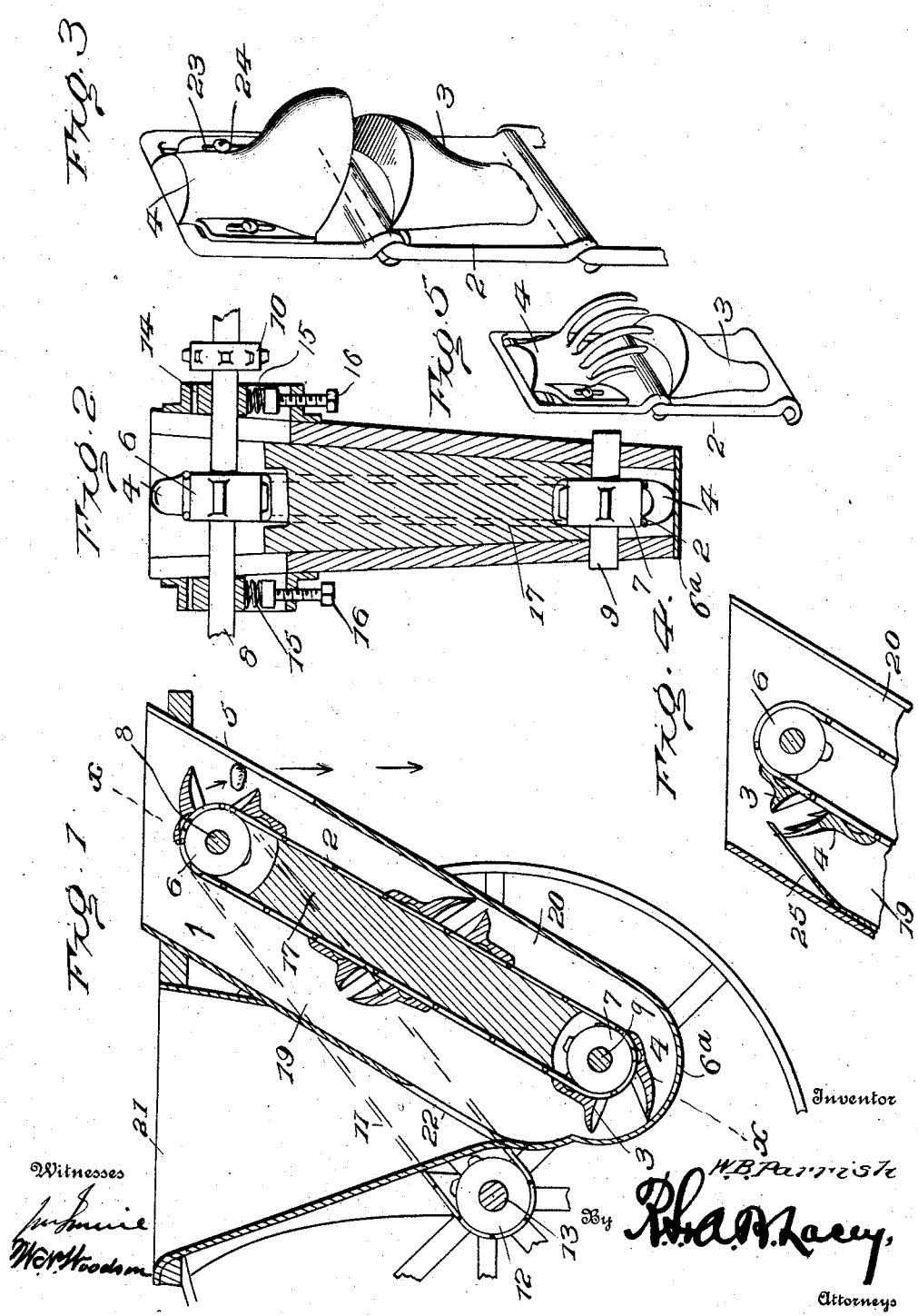

UNITED STATES PATENT OFFICE.

WASHINGTON B. PARRISH, OF KARA, VIRGINIA.

SEED-DROPPER.

No. 883,563.     Specification of Letters Patent.     Patented March 31, 1908.

Application filed October 18, 1907. Serial No. 397,992.

*To all whom it may concern:*

Be it known that I, WASHINGTON B. PARRISH, citizen of the United States, residing at Kara, in the county of Lunenburg and State of Virginia, have invented certain new and useful Improvements in Seed-Droppers, of which the following is a specification.

The present invention appertains to feed mechanism, particularly adapted for dropping seed and has relation to the type of seed droppers embodying an endless belt and cups mounted thereon.

In accordance with this invention the seed to be dropped is gripped between coöperating elements acting as jaws, thereby insuring one seed only being delivered at a time and preventing the dislodgment of the seed from the cups of such mechanisms as embody a belt and cups attached thereto.

A further purpose of the invention is to provide relatively adjustable seed gripping elements or jaws, thereby adapting the dropping mechanism to seed of different sizes and insuring one seed only being gripped and discharged.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a vertical section of a seed dropper embodying the invention. Fig. 2 is a transverse section of the dropping mechanism on the line $x$—$x$ of Fig. 1, looking to the right. Fig. 3 is a detail perspective view of a portion of the belt showing a pair of seed gripping elements or jaws. Fig. 4 is a sectional view similar to Fig. 1 of the upper portion of the seed dropper, showing a modification. Fig. 5 is a detail perspective view similar to Fig. 3 of a modification.

Corresponding and like parts are referred to in the following description and indicated in all the views of the drawings by the same reference characters.

The seed dropper proper comprises a casing 1, a belt 2 and pairs of seed gripping elements or jaws mounted upon said belt, each pair consisting of a fixed element 3 and a detachable and adjustable element 4. The casing 1 may be of any formation and receives the dropping mechanism and adjunctive parts. A discharge opening 5 is provided in the upper rear wall of the casing for the egress of the seed when released from the gripping jaws. The bottom 6ª of the casing is made rounding, the circle being of such diameter as to clear the extremities of the seed gripping elements. The endless belt 2 is supported at opposite ends by means of sprocket wheels 6 and 7 mounted upon shafts 8 and 9 journaled in opposite sides of the casing 1. By providing sprocket wheels and a pivot consisting of links, possible slipping is prevented. Power for driving the endless belt may be applied to either of the shafts 8 or 9 and is shown as operating a shaft 8, the latter being provided with a sprocket wheel 10 around which passes a drive chain 11 passing around a sprocket wheel 12 fast to an axle 13 or other positively rotated part. The bearings 14 for the shaft 8 are both adjustable and yieldable, being mounted upon springs 15 which are adjusted by means of set screws 16. A support 17 is arranged between the sprocket wheels 6 and 7 and the opposite runs of the belt 2 so as to divide the casing into two spaces 19 and 20 in which opposite runs of the belt 2 operate. The space 19 is larger than the space 20 and its lower portion receives the seed to be dropped. It is proposed to provide a hopper 21 for containing a quantity of seed, and this hopper has communication with the lower portion of the space 19 through an opening 22 in the wall of the casing separating the space 19 from the hopper. It will thus be understood that a quantity of seed may be placed in the hopper 21 without interfering with or retarding the operation of the seed dropping mechanism.

The pair of seed gripping elements or jaws 3 and 4 may be attached to the belt 2 at any desired intervals in the length thereof, the space between the gripping faces being adjusted to prevent crushing or injury thereto and yet preclude the dropping of more than one seed at a time. The gripping faces are made concave or hollow as indicated most clearly in Figs. 1 and 3, so as to inclose the seed and prevent possible slipping thereof. The gripping portion of the jaws is enlarged, whereas the attaching portion is contracted to form a shank. The jaw 3 is preferably fixed, whereas the jaw 4 is removable and adjustable to admit of its being replaced by a jaw of different size or form according to the nature of the seed to be dropped. As indicated in Fig. 3, the jaw 4 has side flanges which are provided with slots 23 to receive fastenings 24 by means of which the jaw is both detachably and adjustably connected to the belt. The faces of the jaw or seed gripping elements are approximately parallel, as indicated most clearly in Figs. 1 and 4, and incline to the supporting portion of the belt so that on the upward run the gripping faces incline upward and on the downward run they incline downward, as indicated in Fig. 1. The arrangement of the gripping faces just described insures the taking up of the seed and the retention of the same until the upper end of the belt is reached, when the jaws open and release the seed and the downward inclination of the lower jaw materially assists in the discharge thereof.

For some kinds of seed, such as cotton seed which tends to cling or adhere by reason of the hairy or furry coating, it is desirable to provide a jaw having a series of fingers as indicated most clearly in Fig. 5, the fingers serving to separate the seed and insure one being positively caught between the pair of jaws. Any seed tending to adhere to the jaws or to the seed gripped thereby is removed by means of a brush 25 located at the upper end of the casing 1 and at the top portion of the space 19.

In the operation of the invention, the belt 2 is driven in the direction indicated by the arrows in Fig. 1, that is, with the forward run upward, and the rear run downward. As a pair of jaws passes around either of the sprocket wheels 6 or 7, they open. When the jaws are passed around the lower sprocket wheels 7 of the belt 2, they open and receive a seed, and after clearing said sprocket wheel 7, they close and retain the seed, and upon reaching the upper sprocket wheels 6, the jaws again open and discharge the seed through the opening 5, as indicated in Fig. 1. It is not necessary that the upper portion of the dropper be inclosed, as the seed being caught between the jaws cannot be displaced by a current of air or a jar or knock. It will thus be understood that it is possible to convey the seed from the hopper to near the point of deposit so as to drop the same in the furrow or trench.

Having thus described the invention, what is claimed as new is:

1. Seed dropping mechanism comprising an endless belt, sprocket wheels for said belt, and coöperating seed gripping jaws having independent connection with said belt and projected from the outer side thereof solely and opened by the action of the belt when passing around the said sprocket wheels.

2. Seed dropping mechanism comprising an endless belt, sprocket wheels therefor, seed gripping jaws applied to the outer side of the belt and projected outward therefrom, and means independently connecting the jaws with the belt and admitting of one of the jaws being adjusted towards and from the companion jaw to adapt the jaws to different sizes of seed.

3. In combination, a casing having a rounded bottom and inclined to the perpendicular, a hopper arranged upon the upper side of the casing and in communication therewith, sprocket wheels at opposite ends of the casing, an endless belt mounted upon said sprocket wheels, and coöperating jaws secured to the outer side of said belt and projected outward therefrom at an inclination and having their gripping faces made hollow, said jaws being opened by the action of the belt when passing around the aforesaid sprocket wheels.

In testimony whereof, I affix my signature in presence of two witnesses.

WASHINGTON B. PARRISH. [L. S.]

Witnesses:
V. B. HILLYARD,
W. N. WOODSON.